United States Patent [19]
Lee

[11] Patent Number: 5,811,701
[45] Date of Patent: Sep. 22, 1998

[54] DEVICE FOR MEASURING THE THICKNESS OF METAL FILM ON THE INNER SURFACE OF A PANEL

[75] Inventor: Kil-won Lee, Suwon, Rep. of Korea

[73] Assignee: Samsung Display Devices Co., Ltd., Kyungki-do, Rep. of Korea

[21] Appl. No.: 803,453

[22] Filed: Feb. 20, 1997

[30] Foreign Application Priority Data

Nov. 22, 1996 [KR] Rep. of Korea ................... 96-56807

[51] Int. Cl.$^6$ .................................................. G01N 23/00
[52] U.S. Cl. ........................................................ 73/866.5
[58] Field of Search ............................. 73/866.5, 150 R; 324/229–231; 445/63, 36; 118/712; 427/9, 10

[56] References Cited

U.S. PATENT DOCUMENTS 4,271,699  6/1981  Williamson ................................ 73/159
4,383,172  5/1983  Holler et al. .
4,682,105  7/1987  Thorn ........................................ 427/10

*Primary Examiner*—Robert Raevis
*Attorney, Agent, or Firm*—Leydig, Voit & Mayer, Ltd.

[57] ABSTRACT

A device for measuring the thickness of a metal film on the inner surface of a panel includes a frame located over a panel to be transferred, a guide rail pivotably combined with the frame at one end such that an angle of installation can be adjusted, a dolly installed on the guide rail, for moving back and forth along the guide rail, tracking means combined to the dolly, for transferring the dolly at the speed the panel moves by selectively contacting the side surface of the moving panel, measuring sensors installed at the dolly so as to ascend to and descend from the dolly, for measuring the thickness of a metal film by contacting the panel being transferred, and elevating means for lifting and lowering the measuring sensors with respect to the panel. The device can reduce man hours according to the measurement of the thickness of the metal film on the inner surface of the panel.

14 Claims, 2 Drawing Sheets

DEVICE FOR MEASURING THE THICKNESS OF METAL FILM ON THE INNER SURFACE OF A PANEL

BACKGROUND OF THE INVENTION

The present invention relates to a device for measuring the thickness of a metal film formed on the inner surface of a panel such as a cathode ray tube (CRT) panel, and more particularly, to a device for measuring the thickness of a deposited film formed on the inner surface of a panel while the panel moves.

On the inner surface of a typical panel, a fluorescent film of a predetermined pattern is formed, and a metal film is formed on the surface of the fluorescent film. The metal film reflects light generated from the fluorescent film excited by the collision with electron beams to the front surface of the panel thereby improving luminance, and also protects the fluorescent film from the collisions with the electron beams. The metal film is made of aluminum having excellent reflectivity. As the thickness of the metal film increases, the optical reflectivity thereof increases but less energy of the electron beam transmits through the metal film. Thus, the thickness of the metal film is properly set in view of the optical reflectivity and energy transmissivity.

While the metal film is formed, the thickness thereof is periodically measured and thus controlled.

The thickness of the metal film is measured manually by an operator operating a measuring sensor. The thickness of the metal film is measured with a panel mounted on a metal film depositing device so that the measurement thereof becomes complicated and an accurate measurement is not realized. Furthermore, the panel mounted on the depositing device is intermittently moved so that the measurement as described above becomes more difficult.

SUMMARY OF THE INVENTION

To overcome the above problems, it is an object of the present invention to provide a device for measuring the thickness of a metal film formed on the inner surface of a panel while being transferred together with the panel.

It is another object of the present invention to provide a device for measuring the thickness of a metal film formed on the inner surface of a panel, which can improve the reliability of the measurement of the thickness of the metal film.

To accomplish the above objects, there is provided a device for measuring the thickness of a metal film on the inner surface of a panel, comprising a frame located over a panel to be transferred, a guide rail pivotably combined with the frame at one end such that an angle of installation can be adjusted, a dolly installed on the guide rail, for moving back and forth along the guide rail, tracking means combined to the dolly, for transferring the dolly at the speed the panel moves by selectively contacting the side surface of the moving panel, measuring sensors installed at the dolly so as to ascend to and descend from the dolly, for measuring the thickness of a metal film by contacting the panel being transferred, and elevating means for lifting and lowering the measuring sensors with respect to the panel.

Also, it is preferable that a first actuator be installed on the other end of the guide rail, for adjusting the angle of installation of the guide rail by lifting or lowering the guide rail and a guide slot corresponding to the movement path of the panel be formed on the guide rail.

It is preferable that the tracking means comprises a tracking rod fixed to the dolly at one end and extending vertically downward at the other end so as to not contact the guide rail, and a second actuator, connected to the other end of the tracking rod, for selectively contacting the panel so that the dolly moves along the guide rail according to the movement of the panel.

Furthermore, it is preferable that a vertical passing hole is formed through the dolly, and the elevating means comprises a support plate which is positioned on the lower part of the guide rail to be able to move in a vertical direction with respect to the guide rail and has the measuring sensors connected thereto, and a third actuator provided with a rod fixed to the support plate after passing through the vertical passing hole of the dolly and the guide slot.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
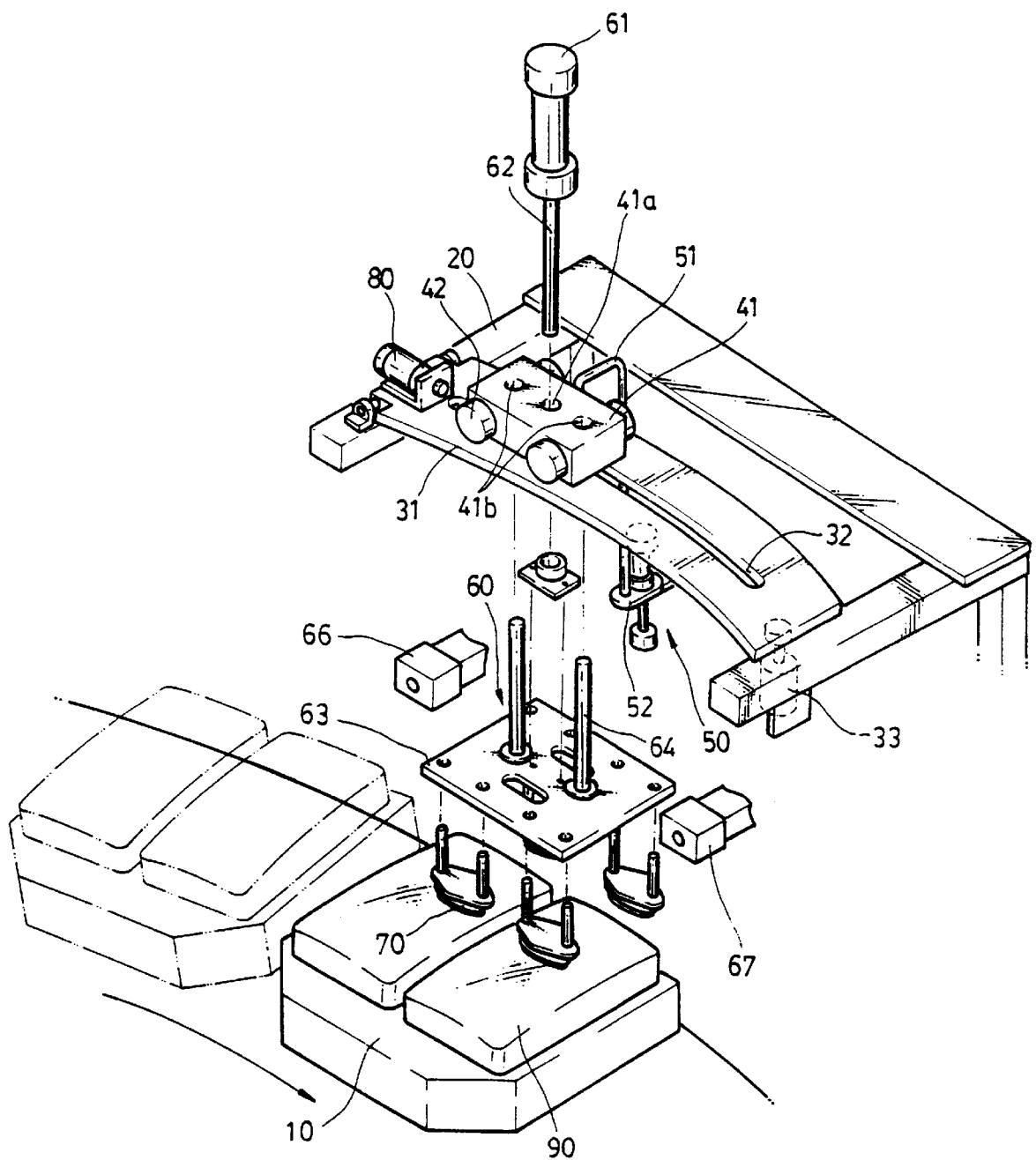
FIG. 1 is an exploded perspective view of a device for measuring the thickness of a metal film formed on the inner surface of a panel according to the present invention.

Referring to FIG. 1, a device for measuring the thickness of a metal film according to the present invention is installed on the upper part of a panel 90 mounted on a transferring plate 10 which is intermittently transferred by a driving motor (not shown) such that the thickness of a metal film (not shown) deposited on the inner surface of the panel 90 is measured. The device for measuring the thickness of a metal film includes: a frame 20 installed adjacent to the transferring plate 10; a flat, curving guide rail 31 installed on the frame 20, of which the installation angle is adjustable; a dolly 41 for reciprocating along the guide rail 31; a tracking means 50, installed on the dolly 41, for transferring the dolly 41 depending on the selective contact with the side of the panel 90; and an elevating means 60, which combines with the dolly 41, for lifting and lowering a metal film thickness measuring sensor 70 with respect to the panel 90.

The dolly 41 moves along the movement path of the panel 90 on the guide rail 31. One end of the guide rail 31 is pivotably hinged to one side of the frame 20, and the other end thereof is supported by the other side of the frame 20. A guide slot 32 corresponding to the movement path of the panel 90 is formed in the guide rail 31. A first actuator 33 is installed on the non-hinged side of the frame 20, which supports the other end of the guide rail 31 and lifts and lowers the free end of the guide rail 31 to rotate the guide rail 31, thereby adjusting the installation angle.

Wheels 42 are installed at either side of the dolly 41 to be able to roll on the guide rail 31.

The tracking means 50 includes a tracking rod 51 of which one end is fixed to one side of the dolly 41 and which extends downward so as to not contact the guide rail 31, and a second actuator 52, combined to the other end of the tracking rod 51, for selectively contacting the panel 90 so that the dolly 41 moves along the guide rail 31 according to the movement of the panel 90.

The elevating means 60 is combined with the dolly 41, and lifts and lowers a plurality of measuring sensors 70 for measuring the thickness of an aluminum film on the inner surface of the panel 90. The elevating means 60 comprises a support plate 63 disposed below the guide rail 31 to be able to move in a vertical direction with respect to the guide rail 31 and having the plurality of measuring sensors 70 connected thereto, and a third actuator 61 provided with a rod 62 fixed to the support plate 63 after passing through a vertical passing hole 41a of the dolly 41 and the guide slot 32. Also, guide rods 64 are affixed to the support plate 63 and pass through the guide slot 32 and slidably insert into vertical passing holes 41b of the dolly 41.

The device for measuring the thickness of a metal film on the inner surface of a panel, according to the present invention, further includes first and second sensors 66 and 67, the first sensor 66 for sensing whether the panel 90 is below the measuring sensor 70 as the transferring plate 10 moves and selectively operating the second or third actuator 52 or 61, and the second sensor 67 for sensing whether the panel 90 has moved outside of an area below the guide rail 31 and operating the first, second, or third actuator 33, 52, or 61. Also, a buffer 80 for buffering impacts during the transfer of the dolly 41 is further provided at the hinged portion of the guide rail 31. Typically, a shock absorber or an elastic spring is used as the buffer 80.

Hereinbelow, operations of the thickness measuring device for a metal film on the inner surface of a panel according to the present invention having the above-described configuration will be described referring to FIGS. 2A through 2C.

Figure 2A:
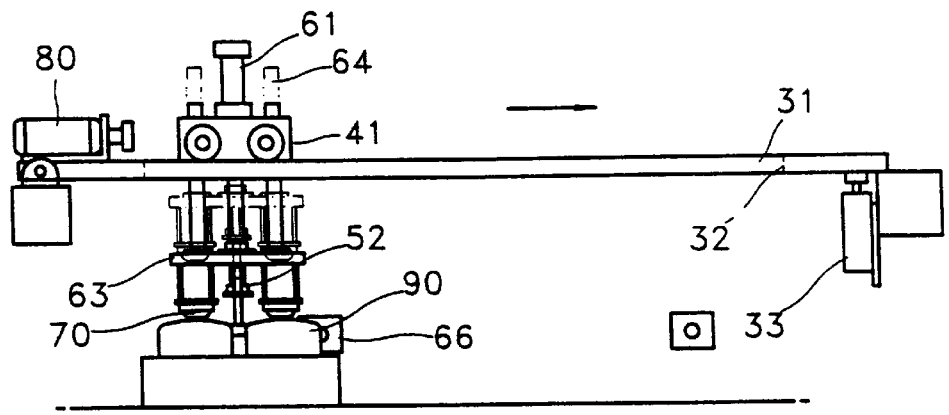
FIGS. 2A through 2C are side views showing the operations of the device according to the present invention.

As shown in FIG. 2A, when the dolly 41 is near the buffer 80, if the panel 90 is detected by the first sensor 66 as the transferring plate 10 moves, the second actuator 52 of the tracking means 50 is operated so that the tracking rod 51 (see FIG. 1) contacts the side surface of the panel 90 and, the third actuator 61 is simultaneously operated to lower the support plate 63 connected to the rod 62 (see FIG. 1), thereby contacting the measuring sensors 70 with the upper surface of the panel 90.

Subsequently, the panel 90 is transferred with the movement of the transferring plate 10. Since the tracking rod 51 of the second actuator 52 contacts the side surface of the panel 90, the dolly 41 also moves along the guide rail 31 at the speed the panel 90 is moving. At this time, since the rod 62 of the third actuator 61 and the guide rods 64 of the support plate 63 pass through the guide slot 32 formed on the guide rail 31, the dolly 41 is transferred as the rod 62 and guide rods 64 move along the guide slot 32.

The measuring sensors 70, being transferred along the track and at the speed the dolly 41 moves, measure the thickness of a metal film formed on the inner surface of the panel 90, while contacting the upper surface of the panel 90.

Figure 2B:
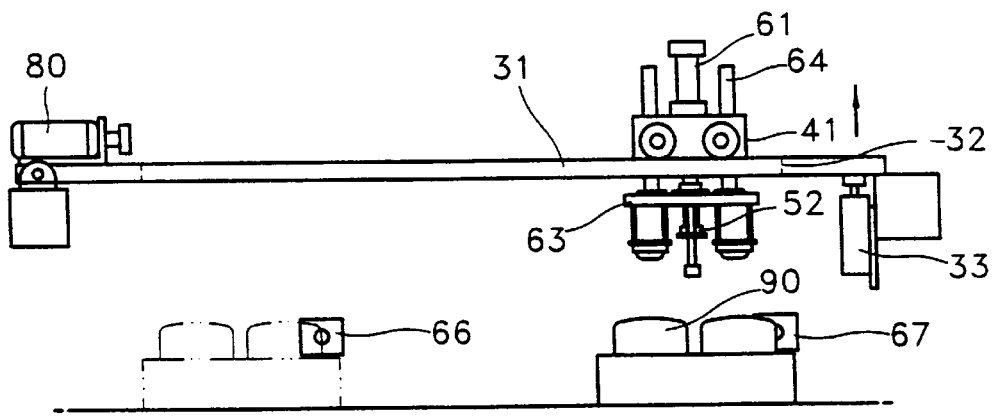

Then, if the panel 90 continues to move and is then detected by the second sensor 67, as shown in FIG. 2B, the second actuator 52 is operated to separate the tracking rod 51 from the side surface of the panel 90, and the third actuator 61 is simultaneously operated to lift the support plate 63. Therefore, the measuring sensors 70 are separated from the upper surface of the panel 90.

Figure 2C:
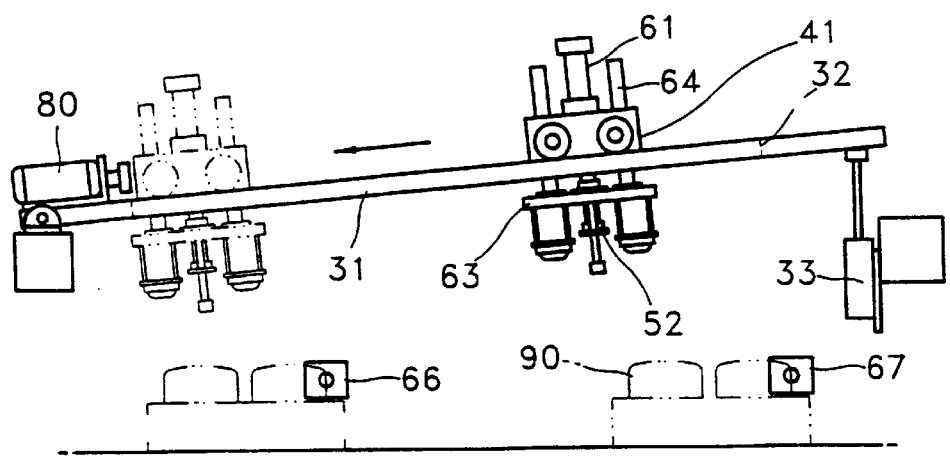

After the measuring sensor 70 is separated from the side surface of the panel 90, as shown in FIG. 2C, the first actuator 33 is operated to lift the other end of the guide rail 31 such that the guide rail 31 is inclined at a predetermined angle. When the guide rail 31 is inclined, the dolly 41 returns to its original position along the guide rail 31 by the force of its own weight. Here, since the buffer 80 is installed at the hinge-combined portion of the guide rail 31, the impact applied to the elevating means 60 and the measuring sensors 70 can be absorbed.

After the dolly 41 returns to the original position, the first actuator 33 is again operated to restore the guide rail 31 to a horizontal state, and then the aforementioned operations are repeated.

As described above, the device for measuring the thickness of a metal film on the inner surface of a panel, according to the present invention, measures the thickness of the metal film on the inner surface of the panel while moving at the speed the panel moves, thereby improving the accuracy according to the measurement and also reducing man hours caused by the manual measurement of the thickness of the metal film formed on the inner surface of the panel.

What is claimed is:

1. An apparatus for measuring the thickness of a metal film on the inner surface of a panel, comprising:
    a frame for positioning over a panel which is to be moved along a path;
    a guide rail having a first end pivotably connected to the frame such that an angle of installation of the guide rail with respect to the frame can be adjusted;
    a dolly installed on the guide rail for moving back and forth along the guide rail;
    a tracking device connected to the dolly for selectively coupling the dolly to the panel such that the dolly and the panel move at the same speed;
    a measuring sensor connected to the dolly for measuring the thickness of a metal film by contacting the panel being moved along the path; and
    an elevating device for moving the measuring sensor with respect to the dolly into and out of contact with the panel.

2. An apparatus as claimed in claim 1 further comprising a first actuator installed at a second end of the guide rail for adjusting the angle of installation of the guide rail by moving the second end of the guide rail with respect to the frame to pivot the guide rail about its first end.

3. An apparatus as claimed in claim 2 wherein the first actuator raises and lowers the second end of the guide rail to adjust the angle of installation.

4. An apparatus as claimed in claim 2 wherein the guide rail includes a guide slot corresponding to the path of movement of the panel.

5. An apparatus as claimed in claim 4 wherein the tracking device comprises a tracking rod having a first end secured to the dolly and a second end extending towards the panel, and a second actuator connected to the second end of the tracking rod for selectively contacting the panel to couple the dolly to the panel.

6. An apparatus as claimed in claim 5 wherein the elevating device includes a support plate supporting the measuring sensor and a third actuator having a movable rod passing through a through hole in the dolly and the guide slot in the guide rail and secured to the support plate so as to move the support plate with respect to the dolly.

7. An apparatus as claimed in claim 6 wherein the support plate is located below the guide rail.

8. An apparatus as claimed in claim 6 further comprising:
    a first position sensor for sensing whether the panel is situated in a first region with respect to the guide rail; and
    a second position sensor for sensing whether the panel is located in a second region with respect to the guide rail,
    wherein the first, second, and third actuator are operatively associated with the first and second position sensors so as to be selectively operated in response to the first and second position sensors.

9. An apparatus as claimed in claim 8 wherein the first position sensor senses whether the panel is situated below the guide rail and the second position sensor senses whether the panel is located outside of an area below the guide rail.

10. An apparatus as claimed in claim 2 further comprising a buffer disposed at the first end of the guide rail for contact with the dolly to absorb impacts.

11. An apparatus as claimed in claim 1 wherein the tracking device comprises a tracking rod having a first end secured to the dolly and a second end extending towards the panel, and an actuator connected to the second end of the tracking rod for selectively contacting the panel to couple the dolly to the panel.

12. An apparatus as claimed in claim 1 wherein the elevating device includes a support plate supporting the measuring sensor and an actuator having a movable rod passing through a through hole in the dolly and secured to the support plate so as to move the support plate with respect to the dolly.

13. An apparatus as claimed in claim 1 wherein the elevating device moves the measuring sensor vertically with respect to the dolly.

14. A method of measuring a thickness of a metal film on a panel comprising:

moving a measuring sensor supported by a movable dolly into contact with a panel being moved along a path;

coupling the dolly to the moving panel such that the dolly is moved in a first direction along a guide rail by movement of the panel;

measuring a thickness of a metal film on the panel with the sensor as the dolly and the panel are moving;

separating the measuring sensor from the panel after measurement of the thickness has been performed;

uncoupling the dolly from the panel; and tilting the guide rail to move the dolly in a second direction along the guide rail opposite to the first direction.

* * * * *